Figure 3:
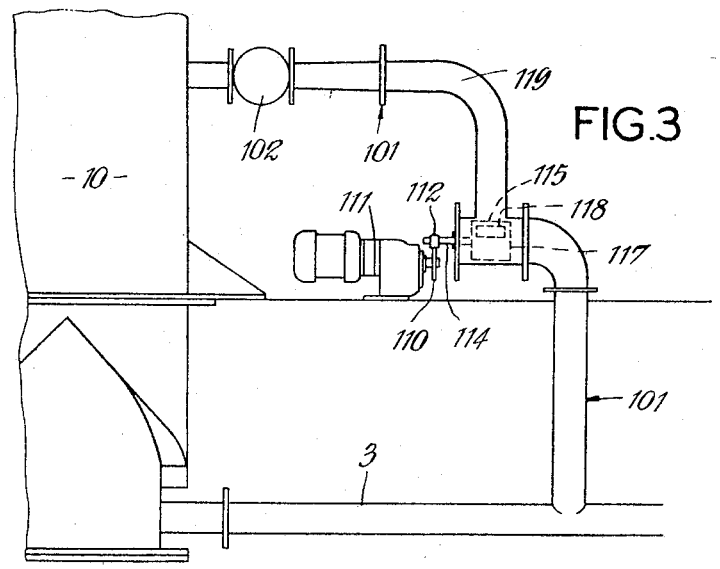

Nov. 29, 1966  G. F. EVESON ETAL  3,288,282
METHOD AND APPARATUS FOR DRYING AND
SEPARATING SOLID PARTICLES
Filed June 20, 1963  3 Sheets-Sheet 1
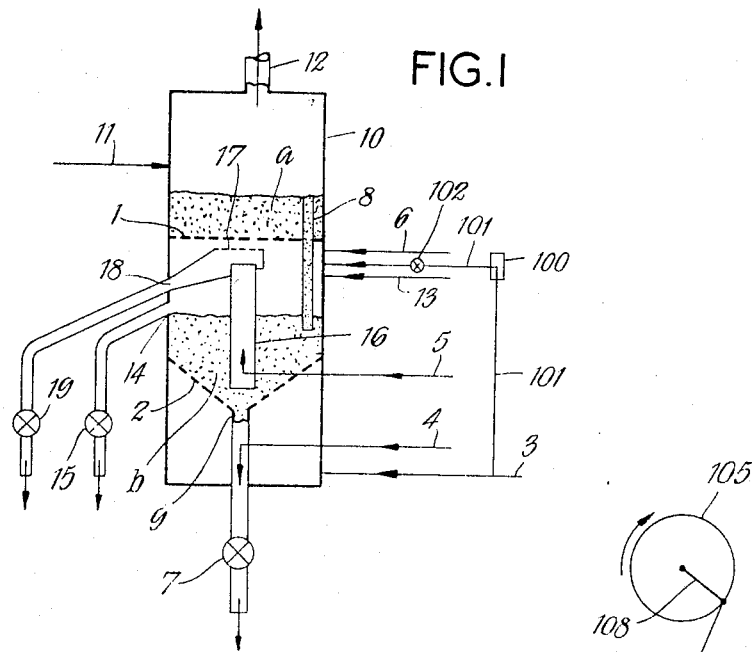
FIG.1
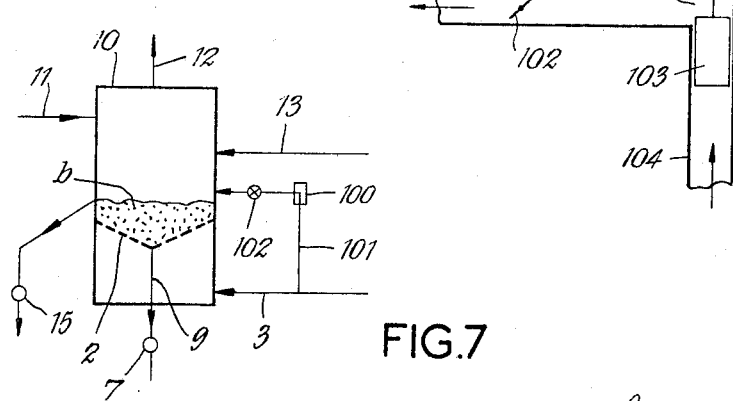
FIG.2
FIG.7
Inventors
Geoffrey F. Eveson,
George T. Richards
By Sommers & Young
Attorneys Inventors
Geoffrey F. Eveson,
George T. Richards
by Sommers & Young
Attorneys

United States Patent Office 3,288,282
Patented Nov. 29, 1966

3,288,282
METHOD AND APPARATUS FOR DRYING AND SEPARATING SOLID PARTICLES
Geoffrey Frank Eveson and George Thomas Richards, Sheffield, England, assignors to Head, Wrightson, & Company Limited, Thornaby-on-Tees, England
Filed June 20, 1963, Ser. No. 289,309
5 Claims. (Cl. 209—11)

This invention concerns improvements relating to the drying and cleaning of small or fine coal, or other particulate materials, containing components of different specific gravities, and is an improvement in or modification of the invention forming the subject of our earlier co-pending United States application Serial No. 171,741.

According to the latter, a process of cleaning or drying and cleaning impure small or fine coal, or other particulate material, having components of different specific gravities, comprises delivering the said coal or other material (both hereinafter referred to simply as "material") into a fluidised bed or beds of discrete solid particles, maintaining the bed or beds in fluidised condition by a heated gaseous medium applied thereto in such a manner as to give, and retain in, the bed or beds a specific gravity effective to cause separation of the said material into two or more fractions of different specific gravities, and freeing the thus separated products from such of the discrete solid particles as discharge with them from the process.

In accordance with the present invention, the fluidised bed or beds, containing the said material delivered thereto for cleaning or drying and cleaning, is or are maintained in fluidised condition by a heated gaseous medium operative in pulsed manner in the bed or beds to effect separation of material into two or more fractions of different specific gravities.

For carrying out the above procedure, it is appropriate to employ apparatus according to the earlier patent application aforesaid though modified to provide for the pulsing of the heated gaseous medium supplied beneath the perforate support or supports for the fluidised bed or beds in which the said material is subjected to separating, or separating and drying, treatment.

It is to be noted that where, hereinafter in the present description and in relation to the separation treatment, the terms "cleaned coal product" and "discard product" are used, it is intended that they shall broadly cover "fraction of relatively low specific gravity" or so-called "floats" product and "fraction of higher specific gravity" or so-called "sinks" product, respectively, of the material subjected to separation. In this manner, it is to be understood that the invention is applicable to the separating, or drying and separating, treatment of all relevant minerals or ores, including coals.

The action of pulsing the heated gaseous medium in accordance with the present invention, causes the mass flow rate of gas to the perforate support or supports to vary in a controlled cyclic manner, from the desired maximum value to a lower value, or even to zero. This is in contrast to passing the heated gaseous medium through the fluidised bed or beds at a constant rate which in some cases has a tendency to produce a circulatory motion of the discrete solid particles which form the separating medium in the separating or cleaning stage, resulting in vertical and radial mixing of these particles in the bed. It has been observed in experiments that particles of the material fed to the bed for separation treatment become associated in such cases with the said circulatory motion, thereby causing some low specific gravity material to report to the sinks product and some high specific gravity material to report to the floats product. The effect of the pulsing of the gaseous medium has been noted as inhibiting the circulatory motion aforesaid, the reduction of the mass flow rate of gas to zero, or approximately so, causing the particles of the separating medium to compact to produce a packed, or almost packed, bed in which relative motion of particles is impossible or practically so. Thus, the pulsing of the gaseous medium supply is operative in the direction of increasing the efficiency with which a given feed material is separated. In particular, it has been noted that the quality of the sinks product is improved, i.e. is freer from components of relatively low or intermediate specific gravity.

Particular forms of apparatus operative for carrying out the process part of the present invention, may be similar, for instance, to apparatus described in the complete specification of the main patent application but with added provision for pulsating the heated gaseous medium supply to the fluidised bed or beds.

Suitably, the apparatus comprises a pulsing means which is disposed in a circuit branched from the heated gaseous medium supply leading to the space beneath the said perforate support or supports, and in its operation delivers pulsed gaseous medium to the space above the fluidised bed or above each such bed on such support or supports. Suitably, the delivery from the branch circuit will additionally be led beneath another perforate support on which the material to be separated is initially subjected to drying and de-dusting treatment in a fluidised bed.

Figure 4:
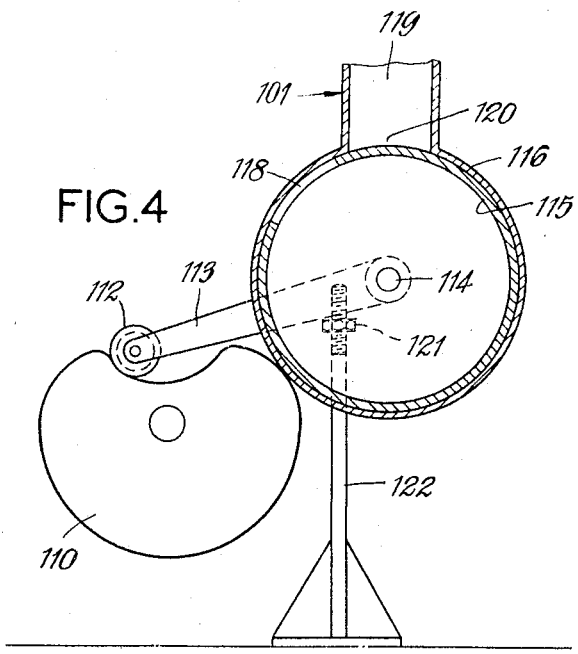
Figure 5:
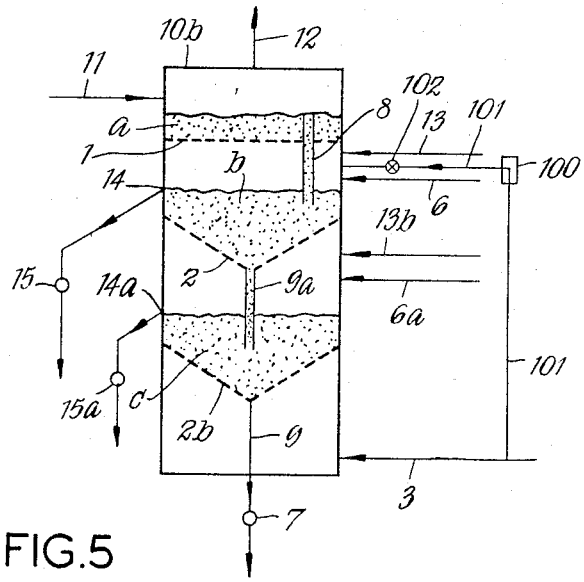
Figure 6:
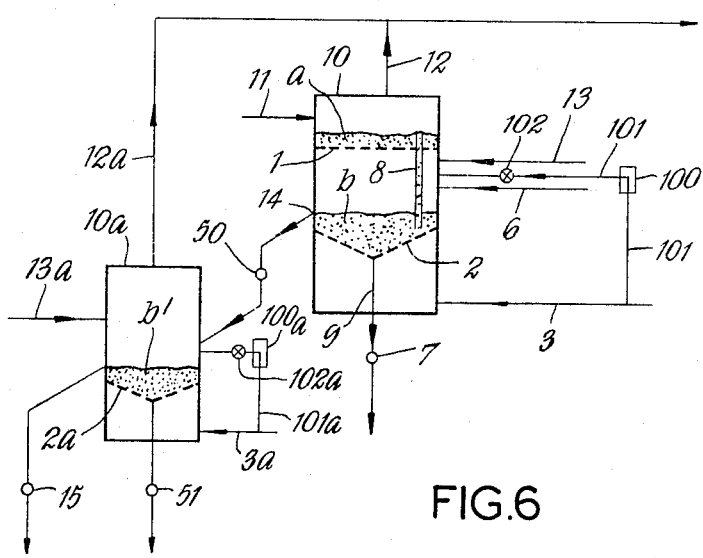

In order to enable the invention to be readily understood, reference is directed to the examples of apparatus shown in the accompanying drawings in which:

FIGURE 1 is a diagrammatic sectional elevation of one example,

FIGURE 2 is a diagrammatic fragmentary sectional elevation showing one form of pulsing mechanism, FIGURE 3 is a fragmentary elevation including a modified form of pulsing mechanism, FIGURE 4 is a sectional elevation of the pulsing mechanism of FIGURE 3 to a larger scale, FIGURE 5 is a diagrammatic sectional elevation indicating the use of the pulsing mechanism with a fluidising vessel having three superposed fluidised beds, FIGURE 6 is a similar view indicating the use of the pulsing mechanism with two fluidising vessels for effecting three-product separation of the feed material, and FIGURE 7 is a like view indicating the use of the pulsing mechanism with a single fluidising separating or cleaning bed.

In the drawings, parts which are similar to those shown in the drawings of the main application or to those appearing in the various figures of the drawings of the present application are similarly numbered or lettered for convenience.

The example of apparatus illustrated in FIGURE 1 embodies a fluidising vessel 10 having perforate supports 1, 2 therein. On the support 1 raw material for treatment is formed into a fluidised bed $a$ for the purpose of drying and de-dusting the same. On the support 2 a fluidised bed $b$ of discrete solid particles is formed to serve as a separating medium for the dried and de-dusted feed material which is transferred from bed $a$ to bed $b$ by overflow from the one bed to the other into and through a downcomer 8. The bed of separating medium at $b$ has a specific gravity intermediate between those of the relatively low-density and high-density components of the feed material and is effective to cause separation of the said material into fractions of different specific gravities. The "floats" product is removed from the bed $b$ by overflow at 14 and delivery past a gas-tight valve 15. The "sinks" product is discharged from the bed $b$ through a down-pipe 9 and past a gas-tight valve 7 therein, this pipe being supplied with heated gaseous medium at 4 to inhibit escape down the pipe of discrete solid particles from the bed $b$. The decsrete solid particles are fed to the bed $b$ at 13, as desired so as to makeup for any removed with the separated fractions. They may be of magnetite, ferro-silicon or other suitable solid material which remains inert in the separating treatment and are hereinafter referred to simply as "magnetite" for convenience. After leaving the fluidising vessel the separated fractions are, of course, treated to recover discrete solid particles therefrom.

As will be realised, the apparatus shown in FIGURE 1 is similar to that described with reference to FIGURES 1 and 2 or FIGURES 3 and 4 of the above mentioned copending application though it may be used with or without the parts or elements 5 and 16 to 19, and with or without the modifications shown in FIGURES 5 and 6, of such application. In accordance with the present invention, however, a pulsing unit 100 is provided in a circuit 101 which is branched from the heated gaseous medium supply 3 to the lower perforate support 2 in the vessel 10, and delivers the pulsed gas to the vessel above the bed $b$ and beneath the upper perforate support 1 suitably under valve control at 102. In addition to the by-pass gas delivered by the branch circuit 101, the supply of non-pulsed heated gas at 6 below the upper perforate support is maintained as in the main application. The supplies at 3 and 6 determine the fluidisation of the beds $a$ and $b$ while the pulsatory supply at 101 determines the pulsing conditions, the pulsations thus being controllable so as to be slow or quicker as may be required.

In carrying out the invention with such an example, there are two main variables which must be subject to independent control namely:

(i) The frequency of the pulsing cycle and
(ii) The proportion of the gas medium supply 3, to the lower perforate support 2, which is by-passed through the branch circuit 101 and the pulsing unit 100.

These variables govern the proportion of each pulsing cycle during which inter-particle motion is impossible, or much reduced, in the fluidised bed $b$, and the frequency with which this occurs. According to the nature of the material (coal, minerals and so on) to be cleaned, the value of each of said variables, appropriate to optimum separating efficiency, must be found by a process of trial and error, but it is considered that the following factors are among those which influence the final selection of the pulsing conditions:

(a) The size range of the feed material,
(b) The size range of the discrete solid particles forming the separating medium,
(c) The mass flow rate of gas through the fluidised bed $b$ of the separating or cleaning stage,
(d) The rate at which feed material is admitted to the separating medium,
(e) The specific gravity composition of the feed material, and
(f) The depth below the surface of the fluidised separating medium at which the feed material is admitted from the drying and/or de-dusting stage.

There are many ways in which well-known items of equipment may be arranged to form the pulsing unit and provide for it to be controlled over a sufficiently wide range of conditions. One such arrangement, illustrated in FIGURE 2, comprises a reciprocatory piston 103 in the upper part of the pipe 104 rising from the supply line 3 aforesaid and forming part of the branch circuit 101. This piston is driven up and down in the pipe by a motor 105, the speed of which may be varied within a desired range, and controls the entry 106 to a pipe 107, also part of the branch circuit 101, leading to the fluidising vessel 10 at a point slightly below the level of the upper perforate support 1. The drive from the motor 105 to the piston 104 is through crank 108 and connecting rod 109 either or each of which may be adjustable to govern the stroke of the piston. Selection of appropriate values for motor speed, throw of crank and length of connecting rod determines the proportion of the area of the aforesaid entry 106 which is uncovered by the piston 103 during each cycle of its operation and the time interval appertaining thereto. During the uncovering, gaseous medium passes through the two pipes 104, 107 from the supply 3, thus by-passing the fluidised bed $b$ of the separating or cleaning stage and setting up therein a pulsating action of the fluidising gaseous medium. This by-passed gas is not wasted since it enters the fluidising vessel below the upper perforate support 1 and assists in the fluidisation of the bed $a$ of the drying and de-dusting stage. In this manner, the mass flow rate of the gaseous medium passing upwards through the fluidised bed $a$ to discharge with entrained dust at 12, remains sensibly constant. Improved control of the pulsing process is obtainable by the control valve 102, suitably of butterfly type, which as shown may be placed in the by-pass line 101 beyond the pulsing device or piston 103.

It will be understood that the means described herein by way of example for use in carrying out the present invention may be incorporated in, or associated with, apparatus of the nature particularly described with reference to FIGURE 7 of the main application or any of its modifications.

The following description and operating data represent a specific embodiment of the process according to the present invention and may be regarded as being typical though not restrictive of the operation of a plant arranged as in FIGURE 7 of the main application but incorporating the gaseous medium pulsing means above described. This embodiment refers to the drying and dry cleaning of a raw coal feed, size $\frac{3}{16}''$–0 and containing 5 percent of surface moisture in which the majority of the particles for a specific gravity separation are within the range 1.26 to 2.60. The fluidising vessel is similar to that shown in FIGURE 1 without the parts or elements 5 and 16 to 19. Hot gases are supplied, at a pressure of about 5 p.s.i. gauge, to various points of the fluidising vessel 10 at the following temperatures and mass flow rates (based on the area of the fluidised bed $b$ or $a$):

Point 3: 150° C.; 190 lbs. per hour per square foot.
Point 4: 150° C.; 150 lbs. per hour per square foot.
Point 6: 350° C.; 257 lbs. per hour per square foot.

Magnetite sized 100 British Standard mesh—0, at a temperature of 150° C., is fed into the fluidising vessel 10 at the point 13 at a rate of 1200 lbs. per hour per square foot of fluidised bed area. The height of the overflow weir, i.e. of the entry to the overflow pipe 8, is adjusted to give a fluidised bed $b$ of depth 5 inches. Raw feed is admitted to the fluidising vessel at point 11 at a rate of 800 lbs. (dry basis) per hour per square foot of fluidised bed area. Dry, or partially dry, feed overflows from the fluidised bed $a$ and passes down the cylindrical overflow pipe 8 into the fluidised bed $b$ of heated magnetite particles; the lower end of the overflow pipe is situated 3 inches below the surface of the fluidised bed of magnetite.

In one experiment, when hot gases were admitted to the fluidised unit at a constant rate, the following results were obtained:

*Cleaned coal product*

Rate of discharge=500 lbs. of cleaned coal per hour per square foot of bed area associated with 820 lbs. of magnetite per hour per square foot of bed area. The cleaned coal contained 8.94% by weight of misplaced material.

*Discard product*

Rate of discharge=300 lbs. of discard product per hour per square foot of bed area associated with 380 lbs. of magnetite per hour per square foot of bed area. The discard product contained 24.63% of misplaced material.

In a second experiment, the hot gas supply admitted to the fluidising vessel 10 at point 3, was pulsed at a rate of one pulsation per second. Hot gases were by-passed through the branch circuit 101 and pulsing unit 103 in 0.1 second, or 10%, of each pulsation cycle. The mass flow rate of gas through the by-passed circuit was 63 lbs. per hour per square foot of bed area; i.e. one third of the mass flow rate of gas admitted to the fluidising vessel at point 3. The following results were obtained:

Cleaned coal product

Rates of discharge=550 lbs. of cleaned coal per hour per square foot of bed area associated with 840 lbs. of magnetite per hour per square foot of bed area. Cleaned coal contained 6.49% of misplaced material.

Discard product

Rate of discharge=250 lbs. of discard product per hour per square foot of bed area associated with 360 lbs. of magnetite per hour per square foot of bed area. The discard product contained 7.87% of misplaced material.

In other respects, the present illustrative embodiment may be similar to that described in the main application.

The modified form of gaseous medium pulsing mechanism shown in FIGURES 3 and 4 comprises a somewhat heart-shaped cam 110 driven by a variable speed motor 111. A co-operative cam follower roller 112 is mounted on a pivotal arm 113 secured to the shaft 114 of a hollow cylindrical valve 115 which rotates in a horizontal valve casing 116, of circular cross-section, inserted in the gas line 101. The valve is open at its trailing end 117 and closed at the other end where it is connected to its shaft 114. A rectangular port 118 is made in its periphery. Beyond the valve casing the branch gas line 101 proceeds as a pipe 119 of rectangular cross-section having dimensions approximately equal to those of the port in the valve. From this pipe such gas line leads past the gate-valve or butterfly valve 102 into the fluidising vessel 10 below the level of the perforate support, cf. 1 aforesaid, for the fluidised bed $a$ aforesaid of the drying and dedusting stage and above the level of the fluidised bed $b$ aforesaid of magnetite of the separating or cleaning stage. As the cam follower 112, under the action of a tension spring if necessary, follows the profile of the rotating cam 110, the rectangular port 118 of the hollow cylindrical valve 115 is brought to register with the inlet opening 120 of the rectangular-section pipe 119. Assuming that one complete revolution of the cam 110 be regarded as constituting one cycle, the cam may be designed so that gaseous medium may pass from the valve 115 through the peripheral port 118 into the pipe 119 for any desired portion of the cycle. It may be arranged that the whole area of the port coincides with the inlet opening 120 to the pipe 119 during the cycle, or the opening may never be completely uncovered during the cycle. Further adjustment of the cyclic movement of the port 118 with respect to such opening 120 may be achieved, on slackening lock nuts (not shown) on the shaft 114, by rotating the valve 115 on such shaft relative to the cam follower 112 and its arm 113, and re-tightening the lock nuts which bear against the closed end of the valve. Again, adjustment of the cyclic movement can be obtained by adjusting the position of a nut 121, on a threaded post 122 engaging beneath the cam follower arm 113. The valve would rotate for only that portion of the cycle that the cam follower arm is caused, by reason of the profile of the heart-shaped cam, to be raised above the nut 121 on the post. For the remainder of the cycle, the cam follower arm rests on the nut and the cam follower is not in contact with the cam, the valve then being stationary. Further control of the mass flow rate of gaseous medium through the pulsing unit can be exercised by the degree of opening of the gate valve or butterfly valve 102. Closure of this valve prevents the flow of gaseous medium through the pulsing unit, even when the cam motor 111 is running; with the valve in a position intermediate between fully closed and fully open, some degree of throttling of the gas mass flow rate is exercised. The above design of pulsing mechanism has as advantages:

(i) The unit absorbs an appreciably smaller amount of power in driving the valve mechanism,
(ii) the unit is more compact,
(iii) the pulsing cycle can be varied readily and over a desirably large range.

The pulsing apparatus hereinbefore described is applicable also to those modifications of the apparatus of the main application comprising a fluidising vessel containing three superposed fluidised beds. For example in FIGURE 5, comprising a third fluidised bed $c$ on perforate support $2b$ for separation of a middlings product, the heated gaseous medium operative in the bed $c$ is pulsed as before, gaseous medium by-passing this bed at 101 being delivered by the pulsing unit 100 below the upper perforate support 1. The pulsing of the gaseous medium in the lowest bed $c$ also results in pulsing of the gaseous medium operative in the intermediate fluidised bed $b$, since a portion of the gaseous medium passing through the latter bed has passed through the lowest bed $c$, the supply of gaseous medium at $6a$ being continous.

Moreover, the pulsing can be adopted in those modifications of the apparatus of the main application illustrating the use of two fluidising vessels for effecting a three-product separation. Thus, as shown by way of example in FIGURE 6 hereof, the heated gas medium operative in he lower fluidised bed $b$ in the vessel 10, and that operative in the single fluidised bed $b^1$ in the other vessel 10$a$, are pulsed at 100, 101 and 100$a$ and 101$a$ respectively, with control valve 102 and 102$a$ accordingly, although the conditions of the pulsing cycle may be different in each vessel.

Furthermore, the pulsing may be adopted in those modifications of the apparatus of the main invention comprising a fluidising vessel containing only one perforate support and fluidised bed, as shown, for instance, in FIGURE 7 of the accompanying drawings. In such cases, the gas by-passed by way of the, or the respective, pulsing unit cannot, of course, be further used in the fluidising vessel but it can be led away at 12 from the upper end of the vessel with the gaseous medium passing through the single bed and the combined gases treated for removal of solid particles therein as described in the main application.

According to another modification of the present invention, which it is believed will be understood without a drawing, the by-pass-pulsing of gaseous medium from the supply to the fluidised bed or beds in order to set up or induce gas operative in pulsed manner in such fluidised bed or beds for cleaning, or drying and cleaning, of the feed material, can be carried out with gaseous medium which is unheated i.e. used at ambient temperature. The means for applying the pulsations of the unheated gaseous medium may be substantially similar to those provided in respect of the heated gaseous medium and, otherwise, the apparatus and process steps involved may also be similar to those above described or those set forth in the main patent application wherever appropriate to this modification.

We claim:

1. Process of drying and cleaning small particulate material having components of different specific gravities, comprising preparing a fluidised bed of discrete solid particles, delivering said material into such fluidised bed, maintaining said bed in fluidised condition by applying pulsating gaseous medium to said bed under pressure from beneath to maintain in such bed a specific gravity intermediate between those of the relatively low-density and high-density components of said material and effective to cause separation of the said material into fractions of different specific gravities, setting up pulsations of gas flow in said bed by supplying pulsating gaseous medium under pressure to an enclosed space open to the top of such bed, removing said fractions separately from each other from said bed, and continuously feeding sufficient of said discrete solid particles to said bed as will substantially replace in said bed those of such particles that become removed with said fractions from such bed.

2. Apparatus for drying and cleaning small particulate material having components of different specific gravities, comprising a fluidising vessel, at least one perforate support in said vessel for a fluidised bed of discrete solid particles, means for feeding said discrete solid particles to said vessel and on to said support, means for supplying gaseous medium to said vessel under conditions operative to form and maintain said fluidised bed, said means comprising a gaseous medium supply line led to the fluidizing vessel at a point beneath the fluidised bed, means operative to produce pulsations of fluid pressure of said gaseous medium in said bed comprising a pulsing unit provided in a circuit for the gaseous medium, which is branched from said gaseous medium supply line, said branched circuit being led to said vessel at a point above said bed, means for feeding said particulate material to said fluidised bed of discrete solid particles for separation of said material into fractions of different specific gravities, means for removing said fractions separately from each other from said bed, and means for continuously feeding sufficient of said discrete solid particles to said bed as substantially to replace in said bed those of such particles as are discharged by said removing means from said bed and to enable the specific gravity of said bed to be maintained at a value intermediate between those of the said fractions.

3. Apparatus according to claim 2, comprising a second perforate support disposed in the fluidising vessel at a position above the point of entry thereto of said branched circuit, means for supplying the particulate material to said second perforate support to be formed into a second fluidised bed subject to the pulsing of the gaseous medium, and means for overflowing material from said second fluidised bed to the first-mentioned fluidised bed.

4. Apparatus according to claim 2, wherein the pulsing unit comprises a reciprocatory piston valve in said branched circuit.

5. Apparatus according to claim 2, wherein the pulsing unit comprises a rotary peripherally ported valve in said branched circuit.

References Cited by the Examiner
UNITED STATES PATENTS

| | | | |
|---|---|---|---|
| 1,472,314 | 10/1923 | Webster | 34—10 |
| 1,801,195 | 4/1931 | Fraser | 209—474 |
| 2,667,706 | 2/1954 | Morse et al. | 34—4 |
| 2,813,351 | 11/1957 | Godel | 34—10 |
| 2,974,419 | 3/1961 | Hauk et al. | 34—57 X |
| 3,027,652 | 4/1962 | Wallace | 34—57 |
| 3,034,222 | 5/1962 | Municio | 34—57 |
| 3,047,473 | 7/1962 | Schmidt | 34—57 |

FRANK W. LUTER, *Primary Examiner.*

NORMAN YUDKOFF, *Examiner.*

F. E. DRUMMOND, *Assistant Examiner.*